US006392587B1

United States Patent
Langbecker et al.

(10) Patent No.: US 6,392,587 B1
(45) Date of Patent: May 21, 2002

(54) METHOD FOR MONITORING DATA FLOWS, SPECIALLY TO PROVIDE RADAR DATA FOR AIR TRAFFIC CONTROL SYSTEMS, AND DEVICE TO IMPLEMENT SAID METHOD

(75) Inventors: Werner Langbecker, Erzhausen; Werner Seja, Waldbronn, both of (DE)

(73) Assignee: DFS Deutsche Flugsicherung GmbH, Offenbach am Main (DE)

( * ) Notice: Subject to any disclaimer, the term of this patent is extended or adjusted under 35 U.S.C. 154(b) by 0 days.

(21) Appl. No.: 09/446,037

(22) PCT Filed: Jun. 15, 1998

(86) PCT No.: PCT/EP98/03580

§ 371 Date: Feb. 15, 2000

§ 102(e) Date: Feb. 15, 2000

(87) PCT Pub. No.: WO98/58470

PCT Pub. Date: Dec. 23, 1998

(30) Foreign Application Priority Data

Jun. 16, 1997 (DE) ............................................. 197 25 370
May 7, 1998 (DE) ............................................. 198 20 324

(51) Int. Cl.⁷ ............................................. G01S 7/40
(52) U.S. Cl. ........................ 342/173; 342/36; 342/165; 342/175; 342/195
(58) Field of Search .................... 342/27–41, 175, 342/195, 165, 173, 174; 701/120–122; 714/100, 1, 2, 25, 699, 799

(56) References Cited

U.S. PATENT DOCUMENTS 5,089,822 A * 2/1992 Abaunza et al. ............. 342/30
5,752,216 A * 5/1998 Carlson et al. .............. 701/120

FOREIGN PATENT DOCUMENTS

DE 36 40 401 A1 6/1988

OTHER PUBLICATIONS

Mayer (1995) "Radnet—A Network for Air Traffic Control", Kommunikation in verteilten Systemen, Konferenz Einzelbericht, vol. 35 (45)–pp. 35–45.

* cited by examiner

Primary Examiner—Barnarr E. Gregory
(74) Attorney, Agent, or Firm—Collard & Roe, P.C.

(57) ABSTRACT

The invention relates to a method and device for monitoring data flow, specially to provide radar data for air traffic control systems. In order to detect data supply failures and to provide an automatic replacement supply, the data which is transmitted is computed at the output of the data transmission device at parameterable time intervals, whereupon the data flow is reproduced, the measuring values are stored during several intervals and compressed into an average value. When a new value is inputted, the oldest value is erased. The average value is used as a starting value for a sensitivity curve which generates a time window for periodic comparison of added measuring values for an error detector which signalizes a total failure of measuring values in a predetermined time unit and initiates a selection mode to access a predefined data source in an appropriate data network and the data is inputted into the respective data supply system via interfaces.

13 Claims, 2 Drawing Sheets

METHOD FOR MONITORING DATA FLOWS, SPECIALLY TO PROVIDE RADAR DATA FOR AIR TRAFFIC CONTROL SYSTEMS, AND DEVICE TO IMPLEMENT SAID METHOD

BACKGROUND OF THE INVENTION

1. Field of the Invention

The invention relates to a method of monitoring the continuous flows of data between the output of data transmission systems and the input of data processing equipment.

2. Prior Art

Such flows of data occur, for example in connection with the transmission of radar data for air traffic control systems. Therefore, the invention particularly concerns a method for providing air traffic control systems or the like with data, whose control centers are supplied with radar data via a network, whereby feeding of the radar installations into the network as well as uncoupling of the radar data for the air traffic control systems takes place via network junctions, and whereby the radar data are transmitted further via networks to integrated operating systems and, if need be, to a backup system. Furthermore, the invention relates to a device for implementing the method.

The European air traffic control organizations of the Netherlands, Belgium, Luxembourg and Germany, and the EUROCONTROL Agency jointly operate a network for supplying control centers with radar data (RADNET=Radar Data Network). Feeding of the radar installations into the RADNET system, as well as uncoupling of the radar data for the air traffic control systems from the RADNET system takes place via network junctions (RMCDE=Radar Message Conversion and Distribution Equipment). Further transmission of the radar data takes place via networks to the integrated operating systems, as well as to a backup system, which, however, only offers limited functionality. In cases of emergency, the backup system is additionally supplied with radar data via a direct tie to the radar stations.

Since the time of introduction of the RADNET system, a regional point is supplied with radar data basically in two ways: while the local radar station in the form of a all-round radar installation at the site of the airport (ASR=Airport Surveillance Radar) is directly fed to the display system via the Radar Message Conversion and Distribution Equipment (RMCDE), all other radar stations of a radar network are made available via the Radar Data Network (RADNET). Versus the method commonly employed prior to the introduction of the RADNET, according to which method all required radar stations had to be fed in directly on the respective processing system, this already constitutes a considerable simplification and thus also a saving of costs.

With the current method for medium and long range radar stations, radar data are fed into two operating facilities of the German Air Control System (DFS=Deutsche Flugsicherung), said facilities being independent of each other. For the local radar stations (ASR—Airport Surveillance Radar), the feed takes place in one location ("local feed"). For a regional point, this means that in addition to the local ASR-station, further line stations are fed in quasi "locally" if such a regional point is a RADNET feed point.

The network junction RMCDE consists of four channels, which are independent of each other, whereby each channel is capable of processing all required radar data. Two of said channels are combined in each case in one unit. Reversing between the two units is possible only manually, whereas within one unit, reversing between the channels takes place automatically in case of error. In the past, problems occurred in isolated cases with the radar supply in spite of the high redundancy of the radar message conversion and distribution equipment (RMCDE). Furthermore, total failure of the radar supply poses a basic problem, which cannot be bridged in any satisfactory manner by the "emergency supply" of the existing backup system, and this not only because only radar data and no flight planning data can be transmitted with the backup system.

Therefore, it has already been proposed earlier to change the RMCDE-concept to the extent that the network junctions are separated into two independent RMCDE's, namely an RMCDE N (=net) and an RMCDE D (=direct). The connection to the RADNET takes place via the RMCDE N, whereas all directly connected radar stations (RADNET feed points) are connected via the RMCDE D. Both RMCDE's transmit their data simultaneously to two networks with a local area of propagation (LAN=Local Area Network), in particular the Ethernet and the FDDI networks. Thus all radar data are available either directly, or via the networks simultaneously and independently of each other to the online system and the backup system. Parallel therewith, all directly connected radar stations are still connected to the backup system via so-called ADR's (all-purpose data replicators). In the event of total failure of all RMCDE's (RMCDE D and RKCDE N), an "emergency" feed takes place via the backup system. However, in this process, only the radar stations intended for the RADNET feed are available for the evaluations. Coverage of the entire air space of a regional point is not accomplished in this way. This would be possible only if in addition to the radar stations required for the RADNET-feed, additional radar stations were directly connected for single coverage of the air space. This, however, would ensue enormous line costs. In addition, the connection capacity of the existing radar stations would have to be expanded, which would particularly result in interface multiplication.

Furthermore, consideration has already been given to install the ADR's for safety reasons not in the same area where the two RMCDE's N and D are already installed, so that in the event both RMCDE's should fail in a fire, at least an emergency feed of the system could be assured via the ADR's by means of the directly connected radar stations. The problem of inadequate radar coverage connected with such an approach could be overcome only by leasing additional transmission lines, which would be connected with considerable costs and connection problems for the radar stations.

In order to assure at least single radar coverage both in the event of total failure of the network junction (RMCDE D and N) and partial failure of the network junction, direct connection of a corresponding number of radar stations is therefore required in connection with the present system.

The backup system employs a PC-based radar data processing system ("TracView"), which, however, permits no connection to the flight plan processing system. The connection of radar stations to the backup system via the ADR's, furthermore, leads to high investment costs and leases for the lines required if more radar stations than those required for the RADNET-feed are fed in. Single radar coverage of the air space could be safely secured only if additional, more remotely located radar stations were directly connected.

SUMMARY OF THE INVENTION

Now, the problem of the present invention is to make available a method of the type specified above, by which in the event of failure of the transmission system, the complete flow of data of the data processing equipment connected downstream is made available again within seconds via an alternative transmission path.

Said problem is solved according to the invention in that the transmitted data are counted at the output of the data transmission device in time intervals with adjustable parameters;

that a data flow is reproduced based on the counted data;

that the transmitted data are stored over several intervals and compressed into an average value;

that when a new value is received, the oldest value is in each case erased (FIFO-buffer);

that the average value of the measured data formed by means of the FIFO-buffer is used for a sensitivity curve, which generates a time window for the periodic comparison of the added data for an error detector;

that the error detector signalizes a total failure of the data to be transmitted in the predetermined time unit, and initiates the selection mode for accessing a predefined data source in a suitable data network; and that the data received in said way are fed into the respective data supply system via interfaces.

A method is already known from EP 0 584 918 A, in connection with which the transmission of serial bit sequences is monitored via a modem. This, however, only serves the purpose of monitoring the lines. In this connection, the data (bits) are located on the image transmission layer (physical layer/OSI layer 1) and cannot be decoded. The bit data of modem channels are different in this connection from information data or useful data that are transported via the switching layer (network layer/OSI layer 1) and the transporting layer (transport layer/OSI layer 4). Only said information data, or useful data supply the flows of data between the data transmission devices and the data processing equipment, said flows of data being of interest in the present case. The bit data dealt with in EP 0 584 918 A are data for synchronization, or data for idling fields, and not information or useful data.

Also the method described in EP 0 606 682 A employs known routines for detecting the carrier frequency and the transmission error rate on the bit transmission layer and the safety layer (physical layer/OSI layer 1; and the link layer/ OSI layer 2). As with the method known from EP 0 584 918 A, only the physical interruption of lines can be detected with such routines. As opposed to the above, according to the method as defined by the invention, an error can be detected also even if the line per se is flawless. Therefore, the information or useful data are checked, but not the bit data of the physical layers OSI 1 and 2.

So that failures can be detected in the radar data supply for air traffic control systems, and a substitute supply with radar data is automatically secured, provision is made according to the invention that on the network of an air traffic control system, the radar target messages are counted in time intervals with adjustable parameters (e.g. seconds);

that a data flow is reproduced based on the radar target messages; that the measured values are stored over several intervals, and compressed into a=n average value;

that when a new value is received, the oldest value is in each case erased (FIFO-buffer);

that the average value of the radar target messages formed by means of the FIFO-buffer is used as input value for a sensitivity curve generating a time window for periodically comparing the added radar target messages for an error detector;

that the error detector signalizes a total failure of the radar target messages in the predetermined time unit, and initiates the selection mode for accessing a predetermined radar data source in the public data network; and that the radar data received in said way are fed into the respective air traffic control system or the like via interfaces.

Even in the event of complete failure of the input of radar data, via the network junctions RMCDE of the RADNET, the feed is made possible within a time interval permitting continuous control of the air traffic, and an undisturbed operating condition is restored without doing without inputting radar stations. A significant advantage of the method as defined by the invention consists in that the radar data operationally required in the event of trouble are made available via automatically selected connections only when there is a demand for such data, instead of holding them available 24 hours per day for a contingency which possibly may never occur. While a time span of one to two antenna rotations (about 10 to 20 seconds) is usually required for safely recognizing the failure of a radar station, it is possible with the method as defined by the invention to safely detect the failure of all radar stations supplying data over the network already in the second raster. In this process, the method does not require any special infrastructure of air traffic control systems, but rather operates independently of the employed hardware.

So that the radar reproduction can be restored within seconds in the event of system errors, provision is made according to the invention that the measured values are stored over several intervals with adjustable parameters of, for example 1 s. It has been found in connection with air traffic control systems that it is advantageous if the measured values are stored over five intervals.

In order to be able to build up complete radar coverage within seconds, the radar stations are selected and the radar data are transmitted via the ISDN or another data network, in particular via a satellite-based data network. In this way, transmission costs are incurred only in a case of actual utilization. Furthermore, the system-inherent redundancies of the ISDN-network guarantee a transmission path whose safety against failure cannot be achieved with a directly connected line.

According to a further development of the idea of the invention, provision is made that the data of the radar stations selected via the ISDN or another suitable data network are received in a monitoring computer (PC), and fed into both the networks, in particular the Ethernet and the FDDI network, and into the backup system with complete circumvention of the network junction (RMCDE).

In order to assure that the radar stations required for the radar coverage are selected in due time, and that the radar data are made available, provision is made according to a further development of the invention that the monitoring logic of the monitoring computer continuously checks the flow of radar data, and that the monitoring logic of the monitoring computer, in the event the flow of data (number of target messages per time unit=self-learning threshold value) is interrupted, interprets this as a criterion for a failed network junction (RMCDE ), and starts building up the selected connections via the ISDN or another data network for all missing radar information.

As stated above, the air traffic control systems are supplied with radar data via network junctions (RMCDE). In a system where several RMCDE's operating independently of each other form a network junction, i.e. where the network junctions may consist of one or a plurality of junction computers (RMCDE's) operating independently of one another, for example an RMCDE N (net) for the connection to the RADNET, and an RMCDE (D (direct), via which all directly connected radar stations (RADNET feed-in points), provision is made according to the invention that for the duration of the failure of an RMCDE N and/or RMCDE D, the radar reproduction systems downstream are supplied with substitute radar data via ISDN- or other selected connections of external network junctions RMCDE's) or radar installations. In this way, all connected radar stations are available again to the radar data processing system within seconds via selected connections (ISDN or the like), with no failure to be found in the radar reproduction. Online and backup systems are continuously supplied with radar data.

In the event of failure of the network junctions RMCDE D, provision is made according to a further development of the invention that the directly connected radar stations or an external network junction (RMCDE) are selected for the duration of the failure of the RMCDE, and that the radar data are made available by the monitoring computer to the networks, in particular to the Ethernet and FDDI networks, via interfaces. The outputs of the RMCDE D are monitored in this connection as with the RMCDE N. The functional sequences for building up the connections are identical and only differ in that other radar stations or other RMCDE's are selected. However, in this connection, it is no longer possible to transmit the radar data to the defective RMCDE. The radar data are rather fed into the networks via interfaces.

The method as defined by the invention can be employed also for monitoring the data flow in a defined time interval. In this case, the system recognizes the difference between a data failure and a time span not monitored.

The device provided for solving the problem of the present invention for implementing the method consists of a network for supplying control centers with radar data (RADNET), into which network the radar data of radio stations are fed via network junctions (RMCDE's), and to which network the radar data for the air traffic control systems are coupled. In this process, the radar data are further transmitted to the integrated operating systems, and, if need be, to a backup system via networks (Ethernet, FDDI-network).

Air traffic control systems have already been designed redundant since a long time, whereby the network junctions, for which substitution is to be connected, are redundant as well. For maintaining the operating condition it is eminently important how fast an error can be detected and eliminated. In connection with an air traffic control system known from the printed document: Cristian F. et al., "Fault Tolerance in Air Traffic Control Systems", ACM Transactions on Computer Systems, Volume 14, No. 3, August 1996, pp 265–286, the redundancies shown there provide no clue with respect to the reversing criteria that are critical in terms of time, and as to the technical design of the monitoring modules, which would show how the redundancies have to be tied into the system, so that the overall system will operate without operational failure.

Therefore, in order to restore in the event of a failure the radar data supply an undisturbed operating condition without having to do without feeding radar stations, and without the emergency operation of the backup system in a time span ensuing from the strict requirements with respect to the reaction behavior of the system in terms of time, provision is made according to the invention that the device consists of an error detection system (=the ARTE system–Automatic Radardata Transmission Equipment), which as a monitoring computer that acquires the radar data downstream of the network junctions (RMCDE's) on the system-internal networks of the air traffic control system; that the monitoring computer compares in periods the number of incoming target messages; that the error detection system uses an average value formed by means of an FIFO-buffer as input value for a sensitivity curve generating a time window for the periodic comparison of the added radar data for an error detector; and that in the event of an error, and in particular in the event of a total failure of the radar target messages, the monitoring computer selects a remote station on the network (RADNET), or one or several radar stations via the ISDN or some other data network, and switches to the air traffic control system additionally required radar data, in particular radar target messages. With such a device it is possible to distinctly increase the quality of the radar data supply, while the costs are reduced at the same time. Furthermore, such a device can be easily adapted to the operational requirements, and it can be realized at favorable costs. Particularly the saving of line costs, the saving of investment and maintenance costs due to omission of the ADR, as well as further possibilities for achieving savings through the possible reduction of RMCDE's employed, and thus savings in the form of reduced continuous operating costs, contribute to the favorable economy calculation.

In order to take into account both the number of radar target messages, which varies analogous to the air traffic density, and the varying number of radar installations feeding in, provision is made according to the invention that the error detector for determining the actual data load is designed self-learning. The loss of radar data is detected in this way more rapidly when the air traffic density is high, and an expanded time span is created for the selection mode in the public data network, in order to achieve the five seconds that have to be maintained overall for the error detection, and to make the radar data available on the network of the air traffic control system.

So as to be able to select the radar sources and to receive the radar data, and to be able to communicate with the networks, the network junction RMCDE, and the PC-based radar data processing system, the work station of the monitoring computer, according to the invention, has different interfaces (ISDN, Ethernet, FDDI, V 24). The type and number of interfaces ensue from the given local requirements.

The device as defined by the invention makes it possible, in the form of a further development of the idea of the invention, to transmit the radar data to authorized users for all sorts of different application even without occurrence of a case of failure, provided such users have access to a public data network. It is possible in this way to make the radar data supply available per selection modes to any desired users both in national and international areas.

Further features, advantages and application possibilities of the invention can be derived from the following description of exemplified embodiments of the invention and the drawing. All described and/or graphically represented features form by themselves, or in any desired combination, the object of the invention irrespectively of their combination in the claims or their dependency on preceding claims.

BRIEF DESCRIPTION OF THE DRAWINGS

Other objects and features of the present invention will become apparent from the following detailed description considered in connection with the accompanying drawings.

It is to be understood, however, that the drawings are designed as an illustration only and not as a definition of the limits of the invention.

In the drawings, wherein similar reference characters denote similar elements throughout the several views:

In the drawing,

FIG. 1 is a schematic representation of the conventional ARD radar feed-in; and

FIG. 2 is a corresponding radar infeed according to the ARTE system as defined by the present invention.

DETAILED DESCRIPTION OF THE DRAWINGS

Figure 1:
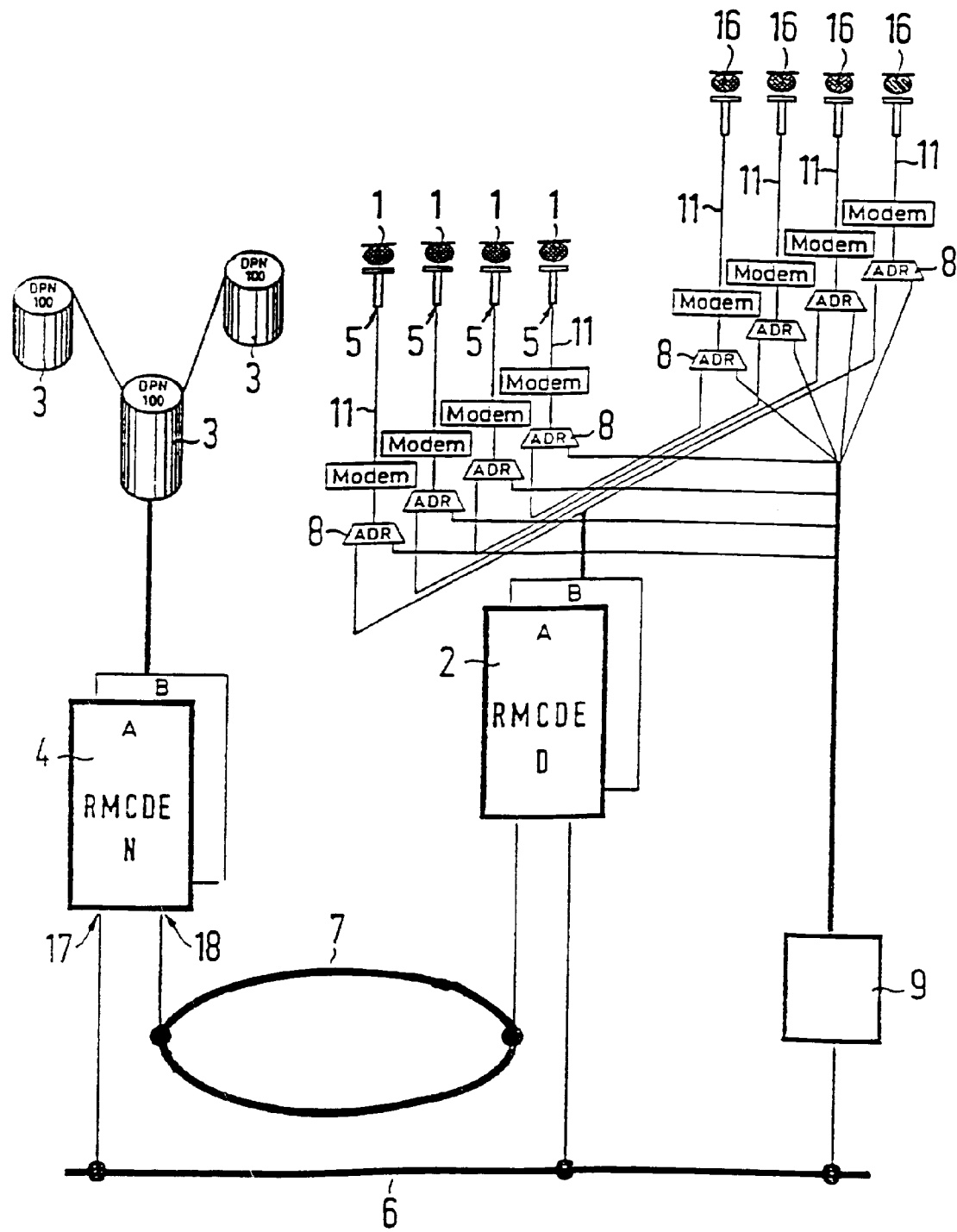

The starting situation shown in FIG. 1 (prior art) for the present invention shows that since the introduction of the RADNET system, a regional point is supplied with radar data substantially in two ways:

The local radar stations 1 are fed via a network junction RMCDE D (direct) 2 and via the LAN's into the reproduction system (not shown). All other radar installations (line) 3 are made available via the RADNET. The feed into the reproduction system takes place in this connection via the network junction RMCDE N (net) 4. The network junctions RMCDE D 2 and RMCDE N 4 are independent of each other. The connection to the RADNET is established via the RMCDE N 4, whereas all directly connected radar stations 1, the latter forming the RADNET feeding points 5, are connected via the network junction RMCDE D 2. Both RMCDE 's 2, 4 simultaneously deliver their data on two networks with local propagation ranges (LAN=Local Area Network), in particular to the Ethernet and the FDDI 7. This means that all radar data are simultaneously available both directly and also via the net independently of the online system and a backup system. In a quasi parallel way with respect to the latter, all directly connected radar stations are also connected to the backup system via so-called ADR's (all-purpose data replicators) 8. In the event of failure of one or all RMCDE's (RMCDE D and/or RMCDE N), an "emergency supply" of the backup system takes place in this way, whereby, however, only the radar stations intended for the RADNET infeed are taken into account. Coverage of the complete air space of a regional point is not achieved in this way.

Feeding of the radar data into the backup system takes place via an LAN into the PC-based radar data processing system 9, which is called the "TracView". For securing the radar coverage, FIG. 1 shows a further radar network whose radar stations 16 are, like the radar installations 1, connected to the network junction RMCDE D via the lines 11, and to the backup system via the ADR's and the radar data processing system 9.

Figure 2:
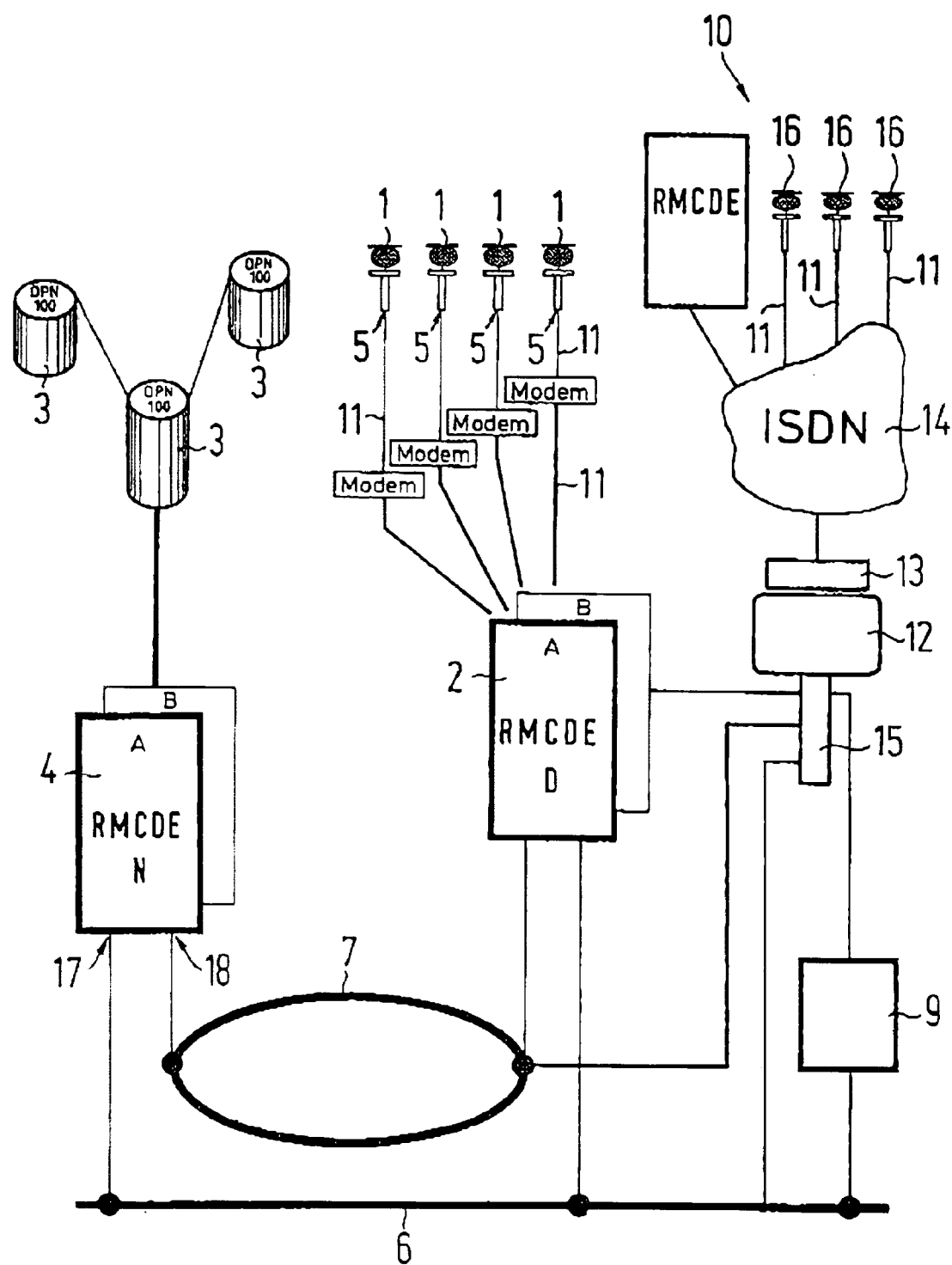

The ARTE system as defined by the invention, which is shown in FIG. 2, is different from the known ADR radar feeding system according to FIG. 1 substantially in that provision is made for a monitoring computer 12, which has the standard interfaces 13 to the ISDN-network 14, and the interfaces 15 to the networks Ethernet 6 and FDDI 7, and, if need be, to a V 24-interface. This provides the monitoring computer 12 with the capability to communicate with the networks 6, 7, the RMCDE's 2, 4, and with the radar data processing system 9.

The monitoring computer 12 of the ARTE system, which can be designed in the form of a PC-workstation, acquires the radar data downstream of the network junctions RMCDE 2 and 4 on the system-internal networks 6, 7 of the air traffic control system, compares in periods the number of incoming target messages, and selects in the event of failure of radar target messages (RMCDE N and/or RMCDE D failure) a remote station 10 in the network for the purpose of supplying the control centers with radar data (RADNET), or one or several radar stations 16, in order to supply the air traffic control system with radar target messages.

In said process, the radar target messages are measured on the network of an air traffic control system in parameterable time intervals by means of a self-learning error detection system, in order to reproduce the flow of data. Said values are stored over five intervals with adjustable parameters and compressed to an average value. When a new value is received, the oldest value is in each case erased (FIFO-buffer=first in, first out buffer). Said method permits self-learning, continuous recognition of the data load, and avoids overrating of anticyclic processes on the network.

The average value formed by means of the FIFO-buffer is used as input value for a sensitivity curve, which generates a time window for the periodic comparison of the added radar target messages for the error detector. With this function, the smallest time unit viewed is adjusted to a decision-relevant number of target messages.

The error detector of the monitoring computer 12 signalizes the total failure of the radar target messages in the predetermined time unit, and initiates the selection mode for accessing a predefined radar data source on the public data network. The radar data received in this way are fed in via interfaces, which are determined by the given constructional status of the air traffic control system to be adapted.

This means that the radar data operationally required in an event of disturbance are made available by way of automatically selected connections only if there is a demand for such data. Otherwise, costly dedicated lines would have to be made available 24 hours per day for a contingency that possibly may never occur.

The radar stations as well as the transmission of the radar data are selected via the ISDN-network. It is possible in this way to build up complete radar coverage within seconds, and to ensure restoration of the radar reproduction within said short span of time. The system-inherent redundancies of the ISDN-network assure in this connection a path of transmission with a failure safety that cannot be accomplished with a directly connected line. With such a substitute supply of radar data, the data of the radar stations selected via the ISDN network are received in a PC, and fed into both the Ethernet 66 and FDDI 7 networks as well as also into the radar data processing system 9, with complete circumvention of the RMCDE network junction. substitution both can take place jointly within five seconds, within which the supply with radar data has to be restored following a system failure.

For the duration of such a RMCDE N-failure, the substitute radar data are fed into the network via ISDN-selection connections, using the ARTE system. In this process, the radar data processing system, for example, is additionally supplied with radar data by the radar stations 10 (RADNET substitute) switched via ISDN selection connections, apart from being supplied by the directly connected radar installations.

In the event of an RMCDE D-failure, the directly connected radar stations, or one or several external RMCDE's are selected, and the data are made available to the FDDI 6 or the Ethernet 7 networks by the monitoring computer 12. The outputs of the RMCDE D are basically monitored in the same way as with the RMCDE N, whereby only other radar sources are selected.

The ARTE system as defined by the invention permits the transmission of data (e.g. radar data) for different applications to authorized users in national and international areas that have access to a public data network.

Accordingly, while only a few embodiments of the present invention have been shown and described, it is obvious that many changes and modifications may be made thereunto without departing from the spirit and scope of the invention.

In the event of failure of the RMCDE N 4, it is assured that the radar stations required for the radar coverage are selected via the ISDN network in due time, and that the radar data are made available to the network. For this purpose, the output 17 of the RMCDE N 4 leading to the Ethernet 6, and the output 18 of the RMCDE N 4 leading to the network FDDI 7, are monitored by the monitoring computer 12 for issued radar data. The monitoring logic continually checks the radar flow of all radar data supplied via networks. As soon as the flow of data (number of target messages per time unit) stops, such stopping is interpreted as a criterion for a failed network junction RMCDE N. In this process, it is possible with the help of a self-learning monitoring logic to continuously follow the varying traffic load of the air space during the day and the night, and to thus track the target messages per time unit as the latter change according to such varying traffic loads. The data load is usefully recognized by means of the FIFO-buffer described above. Such a self-learning monitoring process assures safe detection of errors.

When a failure of the network junction RMCDE N, or of one of its partial components is detected by the monitoring logic at the FDDI/Ethernet output, the monitoring computer 12 will start building up the ISDN selection connections for all failed radar stations. Errors are detected within one second, as a rule. This means that error detection and switching to

What is claimed is:

1. A method for monitoring the continuous data flows between the output of data transmission devices and the input of data processing equipment connected downstream, comprising:

counting the transmitted data at the output of the data transmission device in time intervals with adjustable parameters;

reproducing a data flow based on the counted data;

storing the transmitted data over several intervals and compressing the data into an average value;

erasing the oldest value in each case when a new value is received;

using the average value of the measured data formed by means of the FIFO-buffer as the input value for a sensitivity curve generating a time window for the period comparison of the added data for an error detector;

initiating with the error detector the selection mode for accessing a predefined data source in a suitable data network, wherein said error detector signalizes a total failure of the data to be transmitted in the predetermined time unit; and feeding the data received into the respective data supply system via interfaces.

2. The method according to claim 1, characterized in that the intervals in the step of storing comprise five intervals.

3. The method according to claim 1, wherein said monitoring of the flow of data occurs only in a defined time interval.

4. A method for supplying radar data to air traffic control systems or the like, with the control centers of such air traffic control systems being supplied with radar data via a network, whereby the feed of radar stations into the network as well as the uncoupling of the radar data for the air traffic control systems from the network take place via network junctions; and whereby the radar data are further transmitted via networks to integrated operating systems and to a backup system, said method comprising:

counting the radar target messages on the network of an air traffic control system in time intervals with adjustable parameters;

reproducing a data flow based on the radar target messages;

storing the measured values over several intervals, and compressing said measured values into an average value;

erasing the oldest value in each case when a new value is received;

using the average value of the radar target messages formed by means of the FIFO-buffer for a sensitivity curve generating a time window for the periodic comparison of the added radar target messages for an error detector;

initiating via the error detector the selection mode for accessing a predefined data source on a terrestrial, satellite-supported or the like data network, said error detector signalizing a total failure of the radar target messages in the predetermined time unit; and feeding the radar data received in said way into the respective air traffic control system or the like via interfaces.

5. The method according to claim 4, further comprising selecting the radar stations and transmitting the radar data via ISDN or a satellite-supported data network.

6. The method according to claim 5, further comprising receiving the data of the radar stations selected by the ISDN network or another data network in a monitoring computer and wherein the step of feeding comprises feeding said data into both the networks and into the backup system, with complete circumvention of the network junctions.

7. The method according to claim 6, further comprising continually checking the radar data flow via the monitoring logic of the monitoring computer; wherein the monitoring logic, in the event the flow of data is interrupted, interprets this as a criterion for a failed network junction, and initiates the build up of the selected connections via the ISDN network or another data network for all failed radar messages.

8. The method according to claim 7, whereby provision is made for one or a plurality of network junctions operating independently of each other, and further comprising supplying the radar reproduction systems connected downstream with substitute radar data via selected connections of external network junctions or radar stations over the duration of a total or partial failure of a network junction.

9. The process according to claim 8, further comprising selecting the directly connected radar stations or an external network junction over the duration of a network junction failure, and wherein the radar data are fed by the monitoring computer into the Internet and FDDI networks, via interfaces.

10. A device for monitoring the continuous data flows between the output of data transmission devices and the input of data processing equipment connected downstream, comprising:

a network for supplying control centers with radar data, into which network the radar data of the radar stations are fed via network junctions, and from which the radar data for the air traffic control systems are uncoupled;

integrated operating systems and a backup system for receiving the radar data transmitted via networks;

an error detection system consisting of a monitoring computer (12), which acquires the radar data downstream of the network junction (2) on the system-internal networks of the air traffic control system; which compares the number of incoming target messages in periods; which uses an average value of the radar data formed by means of the FIFO-buffer for a sensitivity curve, which generates a time window for the periodic comparison of the added radar data for an error detector, which, in the event of a total failure of the radar target messages, selects a remote station (10) on the network, and switches to the air traffic control system additionally required data.

11. The device according to claim 10, characterized in that the error detector is designed self-learning for determining the actual data load.

12. The device according to claim 10, characterized in that the monitoring computer (12) has at least one of an ISDN-interface (13), an Ethernet-interface, an FDDI interface, and, a V-24 interface.

13. The device according to claim 10, characterized in that said device is adapted to transmit radar data for all sorts of different applications to authorized users also without an event of disturbance.

* * * * *